J. W. Dixon.
Paper Making Process.
N° 51,704. Patented Dec. 26, 1865.
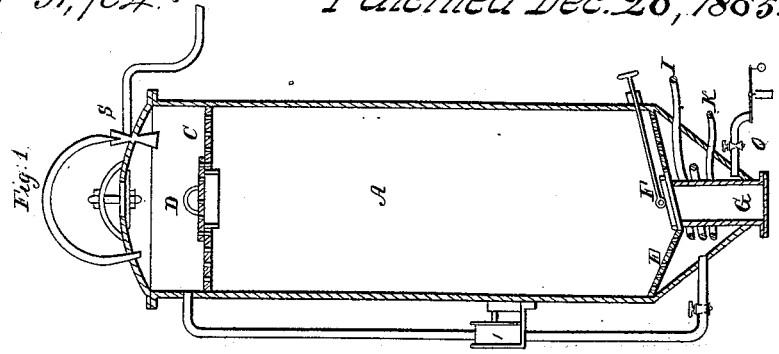
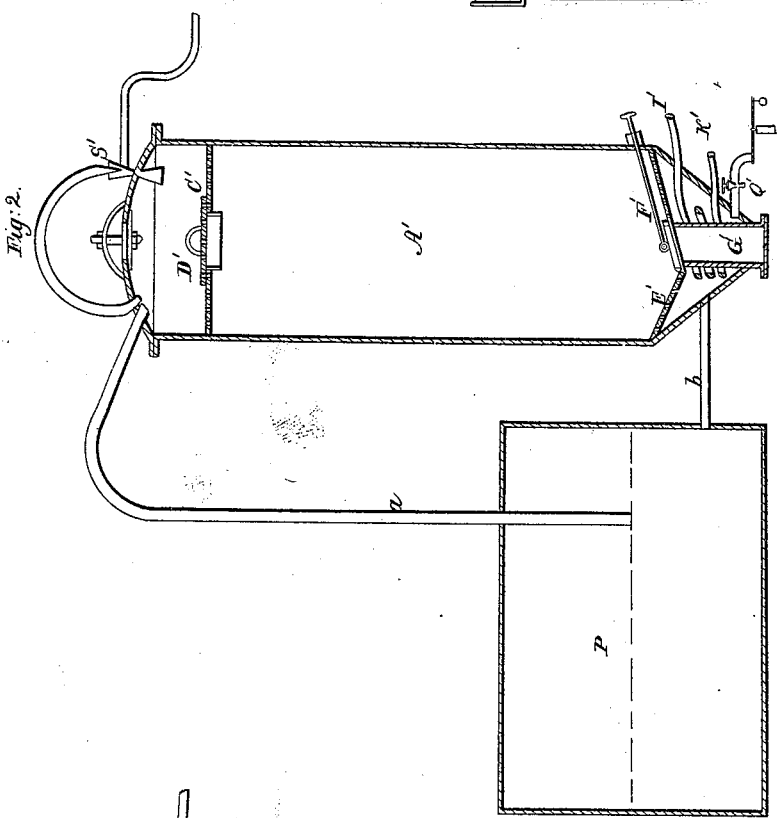
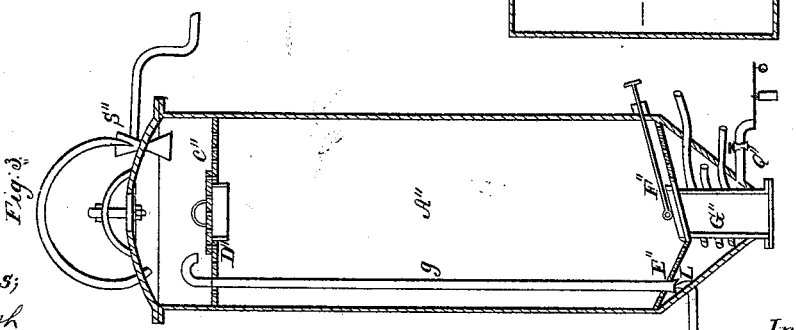
Witnesses;
John Welsh
James Duff
Inventor;
John W. Dixon

UNITED STATES PATENT OFFICE.

JOHN W. DIXON, OF PHILADELPHIA, PENNSYLVANIA.

IMPROVED PROCESS FOR PULPING WOOD, STRAW, &c.

Specification forming part of Letters Patent No. 51,704, dated December 26, 1865.

*To all whom it may concern:*

Be it known that I, JOHN W. DIXON, of the city of Philadelphia and State of Pennsylvania, have invented a new and useful Improvement in the Process of Pulping Wood and Woody Matter, applicable also to straw, cane, and other similar vegetable fibrous material; and I do hereby declare the following to be a full, clear, and exact description of the same, reference being had to the annexed drawings, which represent three forms of apparatus convenient for applying my improved process.

Heretofore it has been proposed to heat wood and woody matters for the purpose of pulping, then by subjecting them in a closed vessel to the combined simultaneous action of a whipping, beating, grinding, or picking mechanism to separate mechanically the fibers, and of water at a high temperature and pressure; but this plan has not been followed, owing to the difficulty of introducing and practically operating mechanism in the boiler, and from other causes. It has also been proposed to mix the woody matter with water and form a maceration, and force this combined mass of wood and water together throughout a continuous tube or coil heated so as to maintain the combined macerated mass of wood and water at a high temperature and pressure; but this plan has not proved practically advantageous, owing to the fact that the stewing or heating the wood while surrounded and saturated with the solution of the gluten and resinous matter naturally contained in it, and then removing the mass into the atmosphere, has the effect of fixing much of the coloring and resinous matter in the woody mass, and even charring some of the resinous and glutinous matter and deepening its color. With this apparatus only a limited degree of pressure was adopted—say, about sixty pounds—for fear of increasing these troubles.

My improvement dispenses with all mechanical treatment of the wood while in the digester; and it consists in circulating the highly-heated water while in a liquid state and under pressure continually through the mass of wood or woody matters to be pulped in such a way that the particles of water in contact with the woody mass shall be continually changed, and thus, by the mere continual passage of the highly-heated water under pressure through the mass, carry off from the woody matter the gummy resinous or silicious matter contained in it. It is also important to drain off or remove from the woody matter all the solution of gummy or resinous matter while the water is at a high temperature; and, secondly, to force into the woody mass while under the action of highly-heated water under pressure, either at intervals or continuously, a fresh supply of water to replace the gummy or resinous water simultaneously forced out by the fresh water forced in.

In applying my combined process I prefer the apparatus heretofore described by me, and for which application has been made for a patent, which consists of a strong iron digester, A, capable of sustaining a pressure of about two hundred to four hundred pounds per square inch. It has a man-hole on top and close fitting cover, an upper perforated diaphragm, c, with a central opening, D, and a lower perforated diaphragm, E, and central opening, F, and sliding valve-covering, the central passage, G, for leading off the digested mass of pulp when produced. The water in the digester is heated by contact with a steam or hot-water coil, introduced at I and passing out at K. l is a pump, which continually forces a circulation of the highly-heated water in a liquid state under pressure from the bottom to the top of the digester A. At S is a Giffard injector or fresh-water pump placed, which forces fresh water into the digester whenever desired. Q is the exit-pipe for the refuse water filled with gummy and resinous matter. It is covered with a safety or weighted valve so adjusted as to open whenever fresh water is forced in.

Instead of the foregoing an apparatus shown in Figure 2 may be adopted, which consists of a digester, A', similar to that shown in Fig. 1, with its upper and lower diaphragms and heating-coil, &c., the same as in Fig. 1.

P is a boiler, placed over the fire or heated otherwise, as may be most convenient. This boiler is connected to the digester by two tubes—tube *a*, which passes from the boiler up onto the top of the digester, and tube *b*, which passes across from the bottom of the digester to boiler P. The effect of this apparatus, the principle of which is well known, is to cause a circulation of the hot water up the tube $a$ and across through $b$ from the bottom of the digester into the heating-boiler P continually.

Another manner of applying my invention is shown in Fig 3, and consists in employing a digester under pressure, such as digester A″, Fig. 3, fitted up exactly as in Fig. 1. From the lower part of the digester a tube, $g$, passes up above the diaphragm C″. A jet of steam is introduced from another boiler, at L, below the mouth of this pipe. to force up the water and thus establish a circulation of highly-heated water under pressure.

These plans are mere illustrations of alternative modes of applying my invention.

The wood or woody matter, straw, &c., having been fed into either of the digesters A, or A′, or A″ through the man-hole at the top, and the aperture D D′ D″ in the diaphragms C C′ C″ closed up, the pump F, Fig. 1, is started, to cause a circulation from bottom to top. In Fig. 2 the heating apparatus itself causes the circulation, and in Fig. 3 the jet of steam introduced at L causes the circulation. In either a circulation of highly-heated water under pressure is caused from the top down through the mass of woody matter through diaphragm E E′ E″, where the water is strained from the woody matter, whence the water so strained is again forced up to the top. This rapid circulation of the highly-heated water under pressure through the woody matter enables the highly-heated water under pressure to dissolve and carry from the woody matter its gummy, gelatinous, and silicous matter without whipping, beating, or grinding. In connection with the foregoing operation fresh water is to be introduced either by an injector or pump, S, S′, or S″, to the upper part of the digesters, either at intervals or continuously. The cock Q, Q′, or Q″ is so loaded in each case as to open at intervals, or whenever fresh water is forced into the digester at S, S′, or S″. Before the woody matter is to be withdrawn a sufficient quantity of highly-heated water under pressure must be passed through it and drained off, so as to leave no gummy matter in it when the woody matter is discharged from the digester by opening the slide-valves F, F′, or F″.

I prefer, in operating on wood, to maintain the water at a pressure of one hundred and fifty pounds and upward and the temperature due thereto, although fair results may be obtained with increased length of time at a somewhat lower pressure—say, one hundred and twenty-five pounds.

I do not desire to claim herein any of the forms of apparatus shown above, as these are merely illustrations of apparatus suitable for applying my invention.

Having thus described my invention, what I claim as new therein is—

1. The continual circulation of highly-heated water in a liquid state under pressure through a mass of woody matter retained in a digester, whereby all mechanical treatment of the woody fibrous material, while subjected to the action of highly-heated water under pressure, is obviated.

2. The combined process of continually circulating highly-heated water in a liquid state under pressure through the mass of woody matter retained in a digester, and of injecting, at intervals or continually, fresh water into said circulating water within the digester, to supply the place of an equal quantity of refuse water forced out.

JOHN W. DIXON.

Witnesses:
JOHN WELSH,
JAMES DUFF.